US010253451B1

(12) United States Patent
Truong

(10) Patent No.: US 10,253,451 B1
(45) Date of Patent: Apr. 9, 2019

(54) DUAL HIERARCHICAL OMNIPHOBIC AND SUPEROMNIPHOBIC COATINGS

(71) Applicant: The United States of America as Represented by the Secretary of the Army, Washington, DC (US)

(72) Inventor: Quoc Truong, Hyde Park, MA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/834,234

(22) Filed: Dec. 7, 2017

(51) Int. Cl.
D06M 23/08 (2006.01)
D06M 15/657 (2006.01)
D06M 15/256 (2006.01)
C09D 7/40 (2018.01)
C09D 5/00 (2006.01)
C09D 183/08 (2006.01)
(Continued)

(52) U.S. Cl.
CPC ............ *D06M 15/657* (2013.01); *C09D 5/00* (2013.01); *C09D 7/67* (2018.01); *C09D 7/68* (2018.01); *C09D 127/12* (2013.01); *C09D 183/08* (2013.01); *D06M 15/256* (2013.01); *D06M 23/08* (2013.01); *D06M 2101/32* (2013.01); *D06M 2200/10* (2013.01); *D06M 2200/12* (2013.01)

(58) Field of Classification Search
CPC .. D06M 15/657; D06M 23/08; D06M 15/256; D06M 2200/10; D06M 2101/32; D06M 2200/12; C09D 7/67; C09D 5/00; C09D 7/68; C09D 183/08; C09D 127/12
See application file for complete search history.

(56) References Cited

U.S. PATENT DOCUMENTS 8,574,704 B2 11/2013 Smith et al.
9,108,880 B2 8/2015 Jin et al.
9,186,631 B2 11/2015 Tuteja et al.
(Continued)

FOREIGN PATENT DOCUMENTS

WO 2011001036 A1 1/2011
WO 2012107406 A1 8/2012
(Continued)

OTHER PUBLICATIONS

Im et al., "Analytical Modeling and Thermodynamic Analysis of Robust Superhydrophobic Surfaces with Inverse-Trapezoidal Microstructures"; Revised Sep. 9, 2010, Langmuir Article, pubs.acs.org/Langmuir, Langmuir 2010, 26 (22), 17389-17397, Published on Web Sep. 29, 2010, DOI: 10.1021/la1031569, 9 pages.

(Continued)

*Primary Examiner* — Nathan L Van Sell
(74) *Attorney, Agent, or Firm* — Roger C Phillips

(57) ABSTRACT

The disclosed subject matter relates to an omniphobic material, including a substrate layer, a first layer of first nanoparticles, the first nanoparticles having a first size and including a particle core and a coating of a fluorodecyl POSS and fluoro-elastomer co-polymer and a second layer of second nanoparticles, the second nanoparticles having a second size and including a particle core and a coating of a fluorodecyl POSS and fluoro-elastomer co-polymer. The first layer of first nanoparticles contact the fabric layer and the second layer of second nanoparticles contact the layer of first nanoparticles. The second size of the second nanoparticles is larger than the first size of the second nanoparticles.

8 Claims, 4 Drawing Sheets

(51) Int. Cl.
*C09D 127/12* (2006.01)
*D06M 101/32* (2006.01)

(56) References Cited

U.S. PATENT DOCUMENTS

| | | |
|---|---|---|
| 2010/0316842 A1 | 12/2010 | Tuteja et al. |
| 2013/0178568 A1 | 7/2013 | Meuler et al. |
| 2013/0220813 A1 | 8/2013 | Anand et al. |
| 2014/0011013 A1 | 1/2014 | Jin et al. |
| 2014/0154512 A1 | 6/2014 | Dooley et al. |
| 2014/0290699 A1 | 10/2014 | Bengaluru Subramanyam et al. |
| 2015/0044421 A1 | 2/2015 | Hassan et al. |

FOREIGN PATENT DOCUMENTS

| | | |
|---|---|---|
| WO | 2015048504 A2 | 4/2015 |
| WO | 2015074077 A1 | 5/2015 |

OTHER PUBLICATIONS

Im et al., "A robust superhydrophobic and superoleophobic surface with inverse-trapezoidal microstructures on a large transparent flexible substrate." Soft Matter, www.rsc.org/softmatter, First published as an Advance Article on the web Feb. 10, 2010, DOI: 10.1039/b925970h, 4 pages.

Jiang et al "Flourinated Raspberry-Like Polymer Particles for Superamphiphobic Coatings", ACS Applied Materials & Interfaces, DOI: 10.1021/am4051074, Publication Date (Web): Feb. 6, 2014, http://pubs.acs.org, 41 pages.

Muthiah et al., "Dual-layered-coated mechanically-durable superomniphobic surfaces with anti-smudge properties." Journal of Colloid and Interface Science, www.elsevier.com/locate/jcis, Available online Jul. 30, 2013, http://dx.doi.org/10.1016/j.jcis.2013.07.032, 10 pages.

Lamison et al. "Water breakthrough pressure of cotton fabrics treated with fluorinated silsesquionxane/fluoroelastomer coatings." Applied Surface Science, Letter to the Editor. www.elseviercom/locate/apsusc, Availabel online Jun. 23, 2012, http://dx.doi.org/10.1016/j.apsusc.2012.06.064, 4 pages.

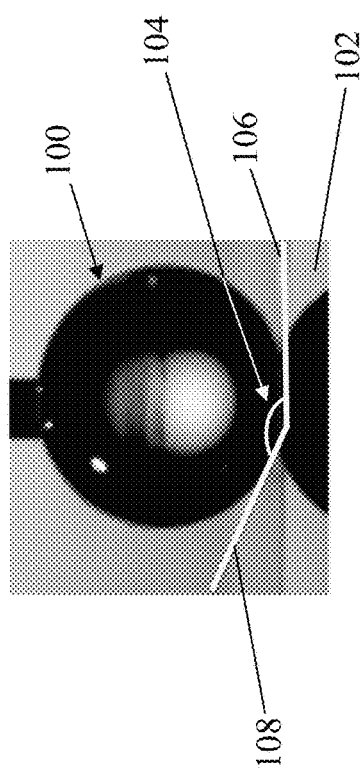
FIG. 1
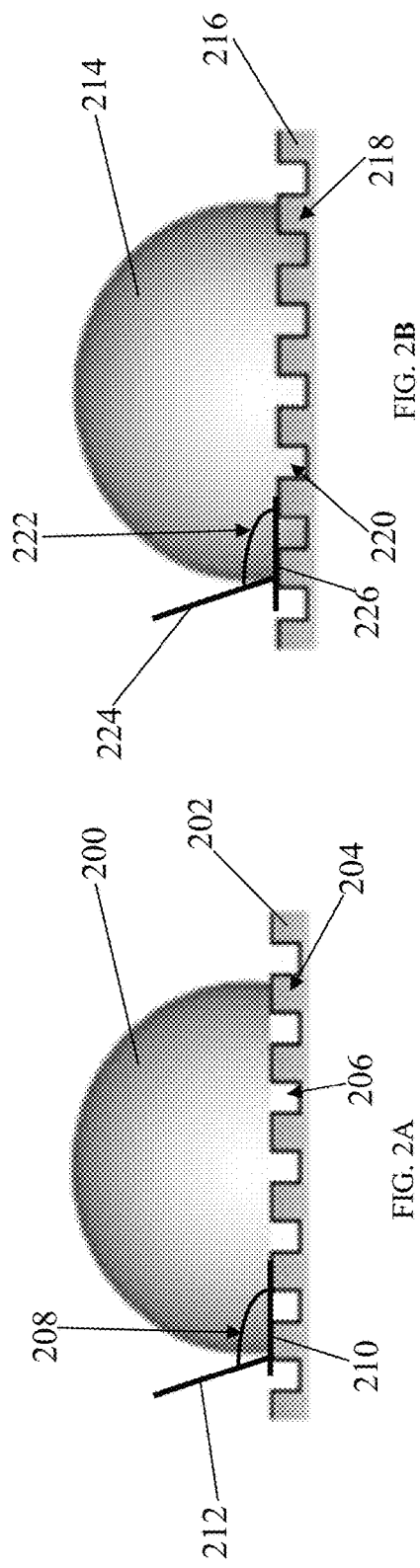
FIG. 2B
FIG. 2A

| DoE Formulation # | Nanoparticle Formulation # | FluoroPOSS (%) | Tecnoflon (%) | NP1 (15 nm) g | NP2 (20-30 nm) g | NP3 (60-70 nm) g | NP4 (500 nm) g | NP5 (1,000-3,000 nm) g |
|---|---|---|---|---|---|---|---|---|
| 23 | F3-1/F1-1 | 50 | 50 | 0.1 | | | | |
| 24 | F3-2/F1-2 | 50 | 50 | 0.01 | | | | |
| 25 | F3-3/F1-3 | 50 | 50 | 0.001 | | | | |
| 26 | F3-4/F1-4 | 50 | 50 | 0.0001 | | | | |
| 27 | F4-1/F1-1 | 50 | 50 | 0.1 | | | | |
| 28 | F4-2/F1-2 | 50 | 50 | 0.01 | | | | |
| 29 | F4-3/F1-3 | 50 | 50 | 0.001 | | | | |
| 30 | F4-4/F1-4 | 50 | 50 | 0.0001 | | | | |
| 31 | F5-1/F1-1 | 50 | 50 | 0.1 | | | | |
| 32 | F5-2/F1-2 | 50 | 50 | 0.01 | | | | |
| 33 | F5-3/F1-3 | 50 | 50 | 0.001 | | | | |
| 34 | F5-4/F1-4 | 50 | 50 | 0.0001 | | | | |
| 35 | F4-1/F2-1 | 50 | 50 | | 0.1 | | | |
| 36 | F4-2/F2-2 | 50 | 50 | | 0.01 | | | |
| 37 | F4-3/F2-3 | 50 | 50 | | 0.001 | | | |
| 38 | F4-4/F2-4 | 50 | 50 | | 0.0001 | | | |
| 39 | F5-1/F2-1 | 50 | 50 | | 0.1 | | | |
| 40 | F5-2/F2-2 | 50 | 50 | | 0.01 | | | |
| 41 | F5-3/F2-3 | 50 | 50 | | 0.001 | | | |
| 42 | F5-4/F2-4 | 50 | 50 | | 0.0001 | | | |
| 43 | F4-1/F3-1 | 50 | 50 | | | 0.1 | | |
| 44 | F4-2/F3-2 | 50 | 50 | | | 0.01 | | |
| 45 | F4-3/F3-3 | 50 | 50 | | | 0.001 | | |
| 46 | F4-4/F3-4 | 50 | 50 | | | 0.0001 | | |
| 47 | F5-1/F3-1 | 50 | 50 | | | 0.1 | | |
| 48 | F5-2/F3-2 | 50 | 50 | | | 0.01 | | |
| 49 | F5-3/F3-3 | 50 | 50 | | | 0.001 | | |
| 50 | F5-4/F3-4 | 50 | 50 | | | 0.0001 | | |
| 51 | NP4/NP1 | 50 | 50 | 0.1 | | | 0.5 | |
| 52 | NP4/NP2 | 50 | 50 | | 0.1 | | 0.5 | |
| 53 | NP4/NP3 | 50 | 50 | | | 0.1 | 0.5 | |
| 54 | NP5/NP1 | 50 | 50 | 0.1 | | | | 0.5 |
| 55 | NP5/NP2 | 50 | 50 | | 0.1 | | | 0.5 |
| 56 | NP5/NP3 | 50 | 50 | | | 0.1 | | 0.5 |
| 57 | NP5/NP4 | 50 | 50 | | | | 0.5 | 0.5 |
| 58 | NP5/NP4 | 50 | 50 | | | | 0.5 | 0.5 |

FIG. 6

DUAL HIERARCHICAL OMNIPHOBIC AND SUPEROMNIPHOBIC COATINGS

The invention described herein may be manufactured and used by or for the U.S. Government for governmental purposes without the payment of any royalties thereon or therefor.

FIELD

The aspects of the disclosed embodiments relate to self-cleaning and enhanced chemical/biological (CB) protective clothing, the fabric used to make the clothing and nanoparticles related thereto.

BACKGROUND

Soldiers cannot avoid getting their uniforms dirty while carrying out their missions, especially on the battlefield. Activities such as maneuvering through muddy terrains or dusty battlefields, and oil-contaminated environment make their clothing dirty. Keeping soldier uniforms clean becomes a lower priority, but it's a capability that still needs to be maintained. To remove dirt and/or contaminants from their clothing, enzymatic, surface active, and/or oil-dissolving detergents are needed. Furthermore, it is necessary to keep the soldiers safe from exposure to wet and cold weather, and in a CB contaminated environment.

Current durable water repellent (DWR) treatment is based on C8 chemistry (perfluorooctanoic acid) that is now banned by the Environmental Protection Agency (EPA). DWR treated clothing keeps the soldier from getting wet in the rain; however, it is washed off over time and not dirt/dust repellent. Current DWR (C8) treated textiles cause heat stress, and lose their liquid repellency after repeated washing and abrasions. C6 (perfluorohexanoic acid) omniphobic treated textiles are durable and repellent to many low surface tension liquids, but many are wetted by methanol and chemical warfare agent (CWA) simulants, and the Ultra EverShield® omniphobic coating that is based on a C6 chemistry, and was developed by the Army Natick RDE Center and commercially transitioned in December 2013 may eventually be targeted by the EPA as well.

Omniphobicity is the ability of a surface to not becoming wet by water (hydrophobicity) as well as liquid chemicals, organic solvents, and oils (oleophobicity). The surface of a hydrophobic treated fabric can only resist water and is easily wet by liquid chemicals, organic solvents, and oils. An oleophobic treated fabric has a dual micro and/or nano-structure that resists liquid chemicals, solvents, & oils. Surfaces that are omniphobic resist wetting by both water and liquid chemicals, solvents, & oils. Superomniphobicity also have the ability to resist surface wetting by low surface tension liquids such as Octane.

It would be desirable to provide textile surfaces that exhibit extreme repellency to low surface tension nonpolar (e.g., Hexadecane, hexane) and polar (e.g., methanol) liquids, while its conformal coating is allowing air and moisture vapor permeation.

SUMMARY

In one embodiment, a nanoparticle is provided. The nanoparticle includes a nanoparticle particle core and a coating of a fluorodecyl POSS and fluoro-elastomer co-polymer.

In another embodiment, an omniphobic or superomniphobic material is provided. The omniphobic material includes a substrate layer including a fabric or a generally textured solid surface, a first layer of first nanoparticles, the first nanoparticles having a first size and including a particle core and a coating of a fluorodecyl POSS and fluoro-elastomer co-polymer and a second layer of second nanoparticles, the second nanoparticles having a second size and including a particle core and a coating of a fluorodecyl POSS and fluoro-elastomer co-polymer, wherein the first layer of first nanoparticles contact the fabric layer and the second layer of second nanoparticles contact the layer of first nanoparticles and the second size of the second nanoparticles is larger than the first size of the second nanoparticles.

In another embodiment, a method of forming an omniphobic or superomniphobic material is provided. The method includes providing a substrate layer including a fabric or a generally textured solid surface, forming a first layer of first nanoparticles on the fabric layer, the first nanoparticles having a first size and including a particle core and a coating of a fluorodecyl POSS and fluoro-elastomer co-polymer and forming a second layer of second nanoparticles on the first layer of first nanoparticle, the second nanoparticles having a second size and including a particle core and a coating of a fluorodecyl POSS and fluoro-elastomer co-polymer such that the second layer of second nanoparticles contact the layer of first nanoparticles and the second size of the second nanoparticles is larger than the first size of the second nanoparticles.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a schematic illustration of surface contact angle of a drop of liquid;

FIGS. 2A and 2B are schematic illustrations of two models of micro/nano-roughness surface architecture;

FIG. 6 is a table showing test results for Examples 1-36.

DETAILED DESCRIPTION

Figure 3:
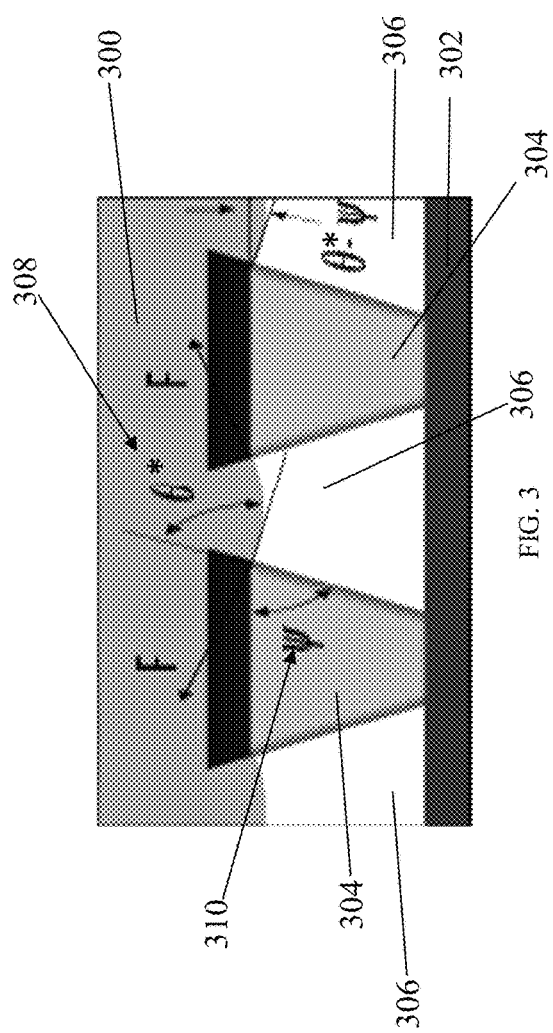
FIG. 3 is a schematic illustration of local surface curvatures.

There are three parameters that can be considered in developing an omniphobic or superomniphobic surface including (1) a surface with an apparent contact angle greater than 150° for a omniphobic surface and greater than 150° for a superomniphobic surface, (2) a micro/nano-roughness surface architecture and (3) local surface curvatures that are created by micro/nano-cavities in which liquid cannot wet the surface.

The surface contact angle is illustrated FIG. 1. FIG. 1 includes a drop of liquid 100 resting on a surface 102. The surface contact angle 104 is the angle between the surface where the liquid drop is resting 106 and its measured (or apparent) contact angle line 108. For a superomniphobic surface, the surface contact angle 104 should be greater than 150°.

The micro/nano-roughness surface architecture can be described using either of the two models. FIG. 2A illustrates the Cassie-Baxter state model of a nonwetting surface. In FIG. 2A, a drop of liquid 200 is resting on a surface 202. Surface 202 includes the top of the pillars 204 with spaces 206 in between these pillars 204 and the spaces 206 between them are substantially void of liquid 200. The apparent contact angle 208 is the angle between the surfaces on top of the pillars 210 and the measured contact angle of the liquid drop where the tangent line to the liquid-vapor interface 212. Where θ* is the apparent contact angle 208, θ* should be greater than 90 degrees and less than 150 degrees for omniphobic surfaces, and greater than 150 degrees and less than 180 degrees for superomniphobic surfaces, where cos θ*=$r_\phi \phi_s$ cos θ+$\phi_s$−1 in which $r_\phi$ is the area fraction of solid surface or the roughness ratio of the wetted surface area under the liquid droplet, θ is contact angle and $\phi_s$ is fraction of the solid surface area that is wetted by the liquid.

FIG. 2B illustrates the Wenzel model of homogeneous wetting. In FIG. 2B, a drop of liquid 214 is resting on a surface 216. Surface 216 includes pillars 218 with spaces 220 in between pillars 218 and spaces 220 that are filled with the wetting liquid 214. The apparent contact angle 222 is the angle between the measured contact angle of the liquid drop where the tangent line to the liquid-vapor interface 224 and the surfaces on top of the pillars and the surfaces within the pillars 226. Where θ* is apparent contact angle 222, θ* should be less than 90 degrees where cos θ*=r cos θ in which θ is contact angle and r is the ratio of real surface area and apparent surface area or the surface roughness ratio of the wetted area under the liquid droplet.

Local surface curvature is illustrated in the embodiment shown in FIG. 3. In FIG. 3, a liquid 300 is resting on a surface 302. Surface 302 includes pillars 304 with spaces 306 in between pillars 304, with pillars being substantially inverse trapezoidal in shape. Angle θ* 308 is defined as apparent contact angle and angle ψ 310 is defined as pillar's trapezoidal (or slanted) angle. If angle θ* 308 is greater than angle ψ 310, as shown in FIG. 3, the net force is directed upward. In this case the liquid-vapor interface recedes to the top of the pillars, creating a composite solid-liquid-air (within the pillars) interface. Thus, the surface allows for the possibility of forming a composite interface provided angle θ* 308 is greater than angle ψ 310, while any liquid for which angle θ* 308 is less than angle ψ 310 will produce a substantially wetted interface where liquid will fill and wet the interior surfaces of the pillars.

Aspects of one embodiment are a durable, conformal omniphobic or superomniphobic coating including a very low surface tension cage-like molecule (for example, Fluoro-POSS, $\gamma_{sv}$=10 mN/m) and a fluorinated elastomer (for example, Tecnoflon®, $\gamma_{sv}$=12 mN/m). The resulting composition has very low interfacial energy between solid and vapor.

Aspects of another embodiment include a fluorodecyl POSS (POSS being Polyhedral Oligomeric Silsesquioxane) ($\gamma_{sv}$≅10 mN/m) and a fluoro-elastomer dissolved in a hydro-chloro-fluorocarbon (HCFC) solvent. Upon curing, the solvent is evaporated and a co-polymer of the fluorodecyl POSS and fluoro-elastomer is formed.

Aspects of another embodiment include a durable, conformal omniphobic coating that includes a very low surface tension cage-like molecule (Fluoro-POSS, $\gamma_{sv}$≅10 mN/m) and a fluorinated elastomer (Tecnoflon®, $\gamma_{sv}$=12 mN/m). The very low surface tension cage-like molecule may have a $\gamma_{sv}$ less than about 10 mN/m. The fluorinated elastomer may have a $\gamma_{sv}$ less than about 12 mN/m. $\gamma_{sv}$ corresponds to surface tension of the solid-vapor interface.

Figure 4:
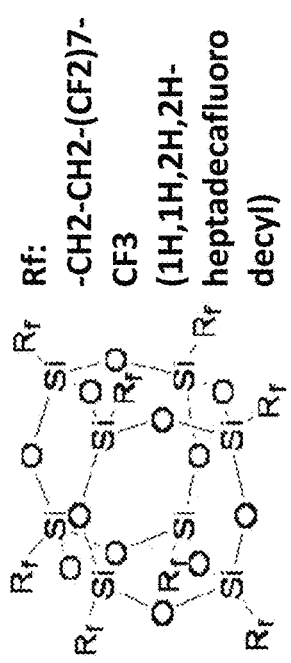
FIG. 4 is a schematic illustration of the fluorodecyl POSS molecule.

Fluorodecyl POSS is a cage-like molecule as shown in the illustration in FIG. 4 that may contribute to the benefits observed. Other suitable components that can be used in place of fluorodecyl POSS can include fluorooctyl POSS, and fluorohexyl. The $\gamma_{sv}$ for such components can range from about 10 mN/m to about 20 mN/m.

Suitable fluoro-elastomers can include Tecnoflon BR 9151 ($\gamma_{sv}$≅12 mN/m) available from Solvay Solexis, Inc ($\gamma_{sv}$≅12 mN/m) or a non-fluorinated elastomer such as silicone [i.e., polydimethylsiloxane (PDMS)] from various vendors. The $\gamma_{sv}$ for such fluoro-elastomers can range from about 12 mN/m to about 22.7 mN/m for fluoro-elastomers and from about 40 mN/m to about 70 mN/m for non-fluorinated elastomers.

In the embodiments, the amount of fluorodecyl POSS may range from about 40% of 1.0 g to about 85% of 1.0 g and the amount of fluoro-elastomer may range from about 15% of 1.0 g to about 60% of 1.0 g. The preferred amounts are about 50% of 1.0 g of fluorodecyl POSS and about 50% of 1.0 g of fluoro-elastomer, the preferred fluoro-elastomer is Tecnoflon™.

The HCFC solvent can include Asahiklin™ AK225 (3,3-Dichloro-1,1,1,2,2-pentafluoropropane) solvent from Asahi Glass Company. Other suitable HCFC solvents that can be used include Vertrel XF from Chemours or Fluosov from Nugentec.

Aspects of another embodiment include coating nanoparticles with a fluorodecyl POSS and a fluoro-elastomer in HCFC solvent and curing the composition to produce a fluorodecyl POSS and a fluoro-elastomer co-polymer coating with a nanoparticle suspension inside. The nanoparticles weight can range from about 0.0001 g to about 0.5 g, with the size ranging from about 10 nm to about 3,000 nm.

Aspects of another embodiment include coating nanoparticles and coating a substrate, such as, for example, fabric or a generally textured solid surface (e.g., a roughened surface) with at least one layer of the so formed fluorodecyl POSS and fluoro-elastomer co-polymer coating with nanoparticle suspension or fluorodecyl POSS and fluoro-elastomer copolymer coated nanoparticles. This embodiment can include applying a plurality of layers of such co-polymer coating with suspended nanoparticles, including each layer having coated nanoparticles of substantially the same size and adjacent layers including coated nanoparticles of a substantially different size from layer to layer, preferably the size of the nanoparticles of successive layers are larger than the size of the previous layer. For example, for adjacent layers, the difference in size of the nanoparticles within the first layer and the subsequent second layer (second layer nanoparticle size: first layer nanoparticle size) can be about 20:1 (e.g., about 20 to 30 nm size particles in the first coating and about 500 nm size particles in the second coating; 500/[(20+30)/2]=20 to 1 ratio). Examples of nanoparticles include silicon oxide, titanium oxide, etc. which can be natural (i.e., non-treated), treated, charged, metalized, or magnetized.

Figure 5:
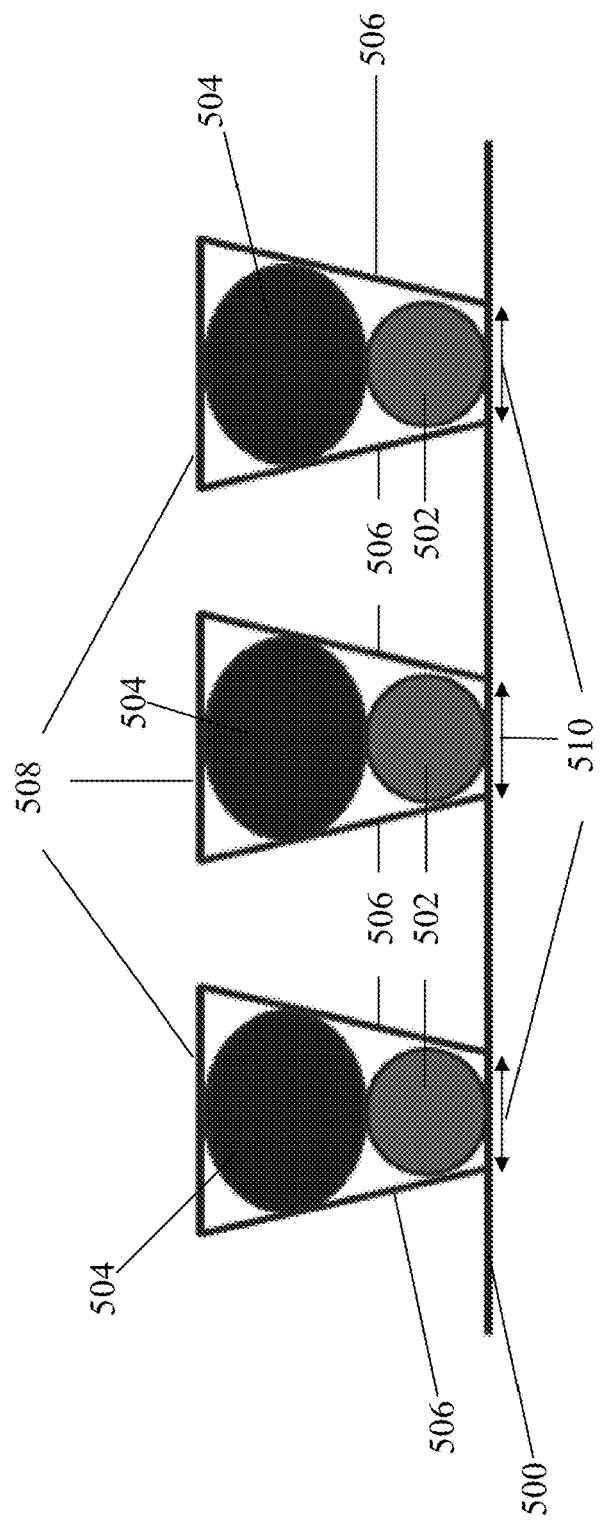
FIG. 5 is a schematic illustration of a cross section of one embodiment of a coating.

Aspects of a preferred embodiment is shown schematically in FIG. 5 may include two layers of coating containing two different size nanoparticles. FIG. 5 includes a substrate layer 500 (such as, for example, a fabric layer or a generally textured solid surface layer (e.g., a generally roughened surface), particularly a substantially flat textured solid surface), a first layer of coated nanoparticles 502 and a second layer of coated nanoparticles 504. Examples of a fabric layer that can be used as the substrate layer 500 include 100% polyester, 100% nylon, 100% rayon, 100% aramid, 50% nylon/50% cotton blends, 95% Nomex/5% Kevlar blends, etc. A tightly woven fabric construction/structure for the base fabric is preferred to increase liquid robustness and to enhance liquid repellency. Fabric structures can also give an added level of repellency to such an embodiment due to their cylindrical fibers' structure. Examples of a textured solid surface that can be used as the substrate layer 500 include (e.g., natural, artificial/engineered surfaces, ultraporous or microporous polymeric membranes, 3D-printed surfaces, micro-patterned surfaces, micro-textured painted or coated surfaces, etc.). Embodiments in which the coating is applied on a generally textured flat surface should have increased repellency compared to an uncoated generally textured flat surface. In this embodiment, the size of the coated nanoparticles 504 are larger than the size of the coated nanoparticles 502 such that the perimeters thereof result in the effect of a substantially inverse trapezoidal shape with legs 506, exterior base 508 and interior base 510. Formation of inverse trapezoidal nano-features are formed through alignment of larger particles in the top layer ($2^{nd}$ coating) onto the smaller nanoparticles in the bottom layer ($1^{st}$ coating) using paramagnetic nano-particles, or an electrically charged coating technique where the first negatively charged coating layer (−) is applied onto a grounded fabric (+) to create the particle to particle alignment.

Aspects of another embodiment includes a method used to form the embodiments included herein. The method includes forming a first layer by immersing the fabric to be treated in a solution of fluorodecyl POSS and fluoro-elastomer in HCFC solvent that also includes the specific nanoparticles to be coated and applied to the fabric. The immersion process may take place from about 5 minutes to about 60_minutes. The coating time depends on the base fabric's composition since certain fabric may have to be surface treated to enhance coating/bonding effectiveness. The fabric can be laid flat to dry. Next, the coated fabric is cured for an amount of time ranging from about 30 minutes to about 1 hour at a temperature ranging from about 60° C. to about 65° C., preferably for about 12 hours at about 60° C. in, for example, a convection oven. The method includes forming a second layer by immersing the fabric to be treated in a different solution of fluorodecyl POSS and fluoro-elastomer in HCFC solvent that includes nanoparticles (preferably different in size, e.g., larger in size, from the nanoparticles used for the first layer) to be coated and applied to the fabric as a second layer. Similar immersion, laying flat and curing steps can again be followed for the second layer. Formation of inverse trapezoidal nano-features are formed through alignment of larger particles in the top layer ($2^{nd}$ coating) onto the smaller nanoparticles in the bottom layer ($1^{st}$ coating) using paramagnetic nano-particles.

Successive coating and curing procedures lead to a durable, conformal super-nonwetting coated fabrics that would resist wetting by low surface tension liquids (including chemical warfare agents, toxic industrial chemicals) and have minimal attraction to dust and dirt. As a result, the fabric and clothing that it is made from are self-cleaning along with providing enhanced chemical/biological (CB) protection. For example, it provides a durable abrasion resistant super-nonwetting and dirt/dust resistant coating to textile products. When fabricated into clothing, the embodiments will provide the wearer (e.g., a warfighter) with textiles that will be extremely repellent to water, oil, and organic solvent, non-staining with minimal to no interference to air and evaporative cooling processes and may, for example, result in increased mission time in CB contaminated battlefield/environment as well as launderable/reusable clothing. The fabric embodiments also support civilian applications in self-cleaning clothing, all-weather gears, tent/shelters & textile structures, sport wears, etc.

Successive coating of dual size nanoparticles embodiments forms inverse trapezoidal features on treated textile surfaces that exhibit extreme repellency to low surface tension nonpolar (e.g., Hexadecane, hexane) and polar (e.g., methanol) liquids, while allowing air and moisture vapor permeation, which is necessary for wear comfort.

FluoroPOSS-Tecnoflon coating chemistry requires less changes in yarn size as compared to Fluoro-alkyl based polyurethane chemistry (UltraTech/Luna) to achieve the same liquid robustness. Therefore, FluoroPOSS-Tecnoflon provides advantages in fabric design in preventing liquid wet through resulting from dual size nano-particles and a reentrant structure that are also enhanced when used with a tightly woven fabric, for example, a tightly woven polyester fabric.

Examples 1-36

Method: Applied double-layer coating, with $1^{st}$ and $2^{nd}$ layers containing nanoparticles. Solution used to apply coating to fabric: 100 mL of Asahiklin, 0.5 g of Fluoro-POSS, 0.5 g of Tecnoflon and nanoparticles Weight Range: 0.0001 g to 0.5 g, Size Range: 15-3,000 nm. Fabric: 100% polyester fabric. Application of each layer included dipping fabric into above Asahiklin, Fluoro-POSS, Tecnoflon and nanoparticles solution for 2 minutes in manually agitated solution; after removal coating fabric was laid flat to dry and cured for 12 hours at 60° C. in a convection oven. Asahiklin AK 225's Component: 3,3-Dichloro-1,1,1,2,2-pentafluoropropane (HCFC-225ca). CAS No. 422-56-0. 40-50%_Component: 1,3-Dichloro-1,1,2,2,3-pentafluoropropane (HCFC-225cb). CAS No. 507-55-1. 60-50%. Each sample was analyzed using apparent contact angle data of water, methanol, hexadecane, and hexane, and their SEM images. Examples 1-36 are identified as formulation numbers 23-58, respectively in the table shown in FIG. 6. The results shown in FIG. 6 indicate that formulations with larger dual-size particles are more repellent and that Formation 52 showed to be the most repellent.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An omniphobic or superomniphobic material, comprising:
   a. a substrate layer including a fabric or a generally textured solid surface;
   b. a first layer of first nanoparticles, the first nanoparticles having a first size and including a particle core and a coating of a fluorodecyl POSS and fluoro-elastomer co-polymer;
   c. a second layer of second nanoparticles, the second nanoparticles having a second size and including a particle core and a coating of a fluorodecyl POSS and fluoro-elastomer co-polymer, wherein the first layer of first nanoparticles contact the substrate layer and the second layer of second nanoparticles contact the layer of first nanoparticles and the second size of the second nanoparticles is larger than the first size of the first nanoparticles.

2. The omniphobic material of claim 1, wherein each of the first nanoparticle core and the second nanoparticle core ranges in weight from about 0.0001 g to about 0.5 g.

3. The omniphobic material of claim 1, wherein the fabric is a tightly woven polyester fabric comprising at least one of 100% nylon, 50% nylon/50% cotton and 95% Nomex/Kevlar.

4. The omniphobic material of claim 1, wherein the amount of fluoro-elastomer ranges from about 15% of 1.0 g of the coating to about 60% of 1.0 g of the coating.

5. The omniphobic material of claim 1, wherein the amount of fluorodecyl POSS ranges from about 40% of 1.0 g of the coating to about 85% of 1.0 g of the coating.

6. The omniphobic material of claim 1, wherein the amount of fluoro-elastomer is about 50% of 1.0 g of the coating and the amount of fluorodecyl POSS is about 50% of 1.0 g of the coating.

7. The omniphobic material of claim 1, wherein the first size of first nanoparticles and the second size of second nanoparticles range in size from about 15 nm to about 3,000 nm.

8. The omniphobic material of claim 1, wherein the ratio of the second size of the second nanoparticles to the first size of the first nanoparticles is about 20:1.

* * * * *